(12) United States Patent
Colgan et al.

(10) Patent No.: US 6,377,233 B2
(45) Date of Patent: Apr. 23, 2002

(54) MICROMECHANICAL DISPLAY AND FABRICATION METHOD

(75) Inventors: Evan G. Colgan, Chestnut Ridge; Laura L. Kosbar, Mohegan Lake; Alan E. Rosenbluth, Yorktown Heights, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/918,249

(22) Filed: Jul. 30, 2001

Related U.S. Application Data

(62) Division of application No. 09/168,456, filed on Oct. 8, 1998.

(51) Int. Cl.[7] .................................................. G09G 3/34
(52) U.S. Cl. .............................. 345/84; 345/85; 345/90; 345/92; 345/93; 345/97; 345/98; 359/222; 359/223; 359/224; 359/291; 359/293; 359/295; 359/298; 359/900
(58) Field of Search .............................. 345/84, 85, 90, 345/92, 93, 97, 98; 359/222, 293, 298, 224, 900, 291, 295, 223

(56) References Cited

U.S. PATENT DOCUMENTS

| | | |
|---|---|---|
| 4,178,077 A | 12/1979 | Te Velde |
| 4,519,676 A | 5/1985 | te Velde |
| 4,674,180 A | 6/1987 | Zavracky et al. |
| 4,729,636 A | 3/1988 | Te Velde et al. |
| 5,172,262 A * | 12/1992 | Hornbeck .................... 359/223 |
| 5,506,171 A * | 4/1996 | Leonard et al. ............. 437/187 |
| 5,638,946 A | 6/1997 | Zavracky |
| 5,719,846 A * | 2/1998 | Matoba et al. .............. 359/112 |
| 6,108,121 A * | 8/2000 | Mansell et al. ............. 359/291 |
| 6,323,834 B1 * | 11/2001 | Colgan et al. ................ 345/84 |

OTHER PUBLICATIONS

Ogawa et al., 16.1: Invited Paper: The Trends of Reflective LCDS for Future Electronic Paper, SID 98 Digest, First Edition, ISSN 0098–966X, pp. 217–220, May 1998.

Sampsell, 47.6: Late–News Paper: An Overview of the Digital Micromirror Device (DMD) and Its Application to Projection Displays, SID 93 Digest, ISSN 0097–966X, pp. 1012–1015, May 1994.

D. M. Bloom, The Grating Light Valve: revolutionizing display technology, SPIE vol. 3013, pp. 165–171. 1997.

(List continued on next page.)

*Primary Examiner*—Richard Hjerpe
*Assistant Examiner*—Jean Lesperance
(74) *Attorney, Agent, or Firm*—F. Chau & Associates, LLP

(57) ABSTRACT

A display device, in accordance with the present invention includes a transparent substrate and an array of pixels formed on the substrate, each pixel comprises a transparent electrode and a deformable member electrically actuated between a first state and a second state, wherein in the first state a liquid including a dye is disposed in a gap between the transparent electrode and the deformable member and wherein in the second state the deformable member reduces the gap between the transparent electrode and the deformable member such that the liquid is substantially removed between the deformable layer and the transparent electrode in the area of contact. A plurality of switches are formed on the substrate for supplying control signals to the array of pixels to selectively actuate the deformable members of the pixels, wherein each switch comprises an actuating member movable between an active state and an inactive state, whereby in the active state any control signal supplied to the switch passes through the switch, and in the inactive state any control signal supplied to the switch is prevented from passing through the switch. Fabrication methods are also disclosed.

9 Claims, 14 Drawing Sheets

OTHER PUBLICATIONS

E. Stern, Large–Area Micromechanical Flat–Panel Display, ISSN 1083–1312/97/1701–0230, pp. 230–233, 1997.

M.W. Miles, 7.3: A New Reflective FPD Technology Using Interferrometric Modulation, ISSN 0097–0966X/97/2801–0071, SID 97 Digest, pp. 71–74, 1997.

Ties S. te Velde, A Family of Electroscopic Displays, SID 80 Digest, pp. 116–117.

Sanford et al., Silicon light–valve array chip for high–resolution reflective liquid crystal projection displays, IBM J. Res. Develop., vol. 42, No. 3/4, pp. 347–358, May/Jul. 1998.

Zavracky et al., Micromechanical Switches Fabricated Using Nickel Surface Micromaching, Journal of Microelectromechanical Systems, vol. 6, No. 1, Mar. 1997.

* cited by examiner

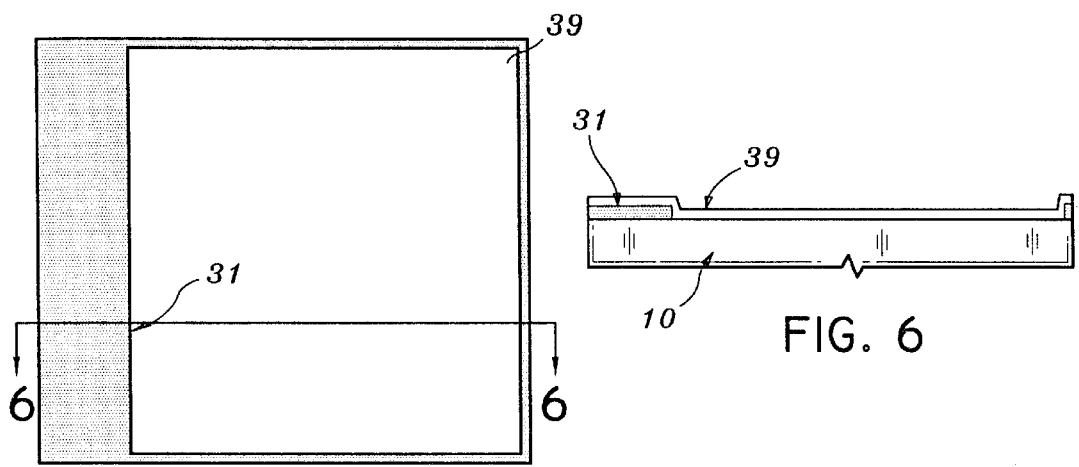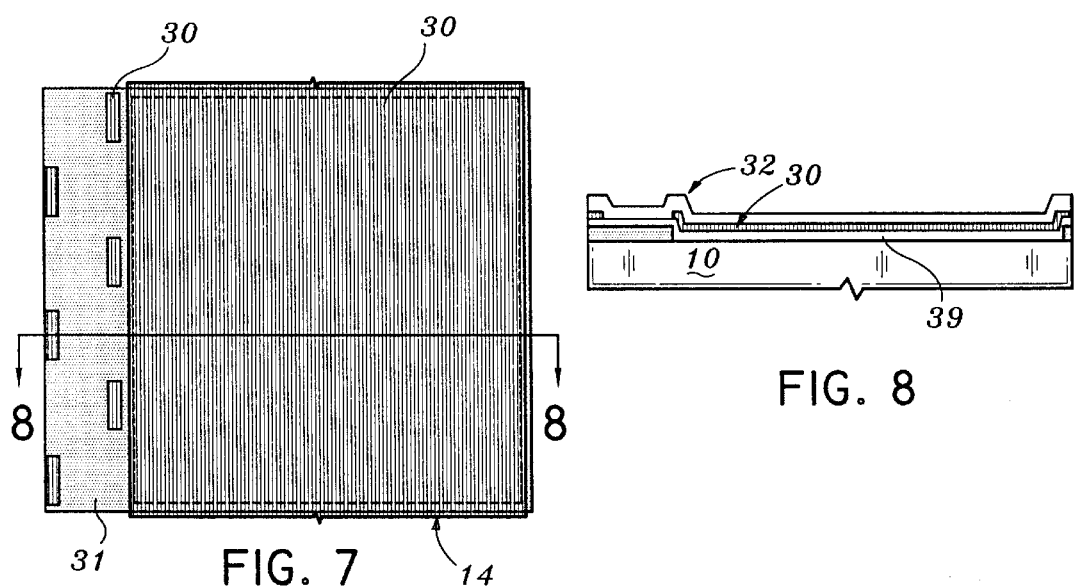

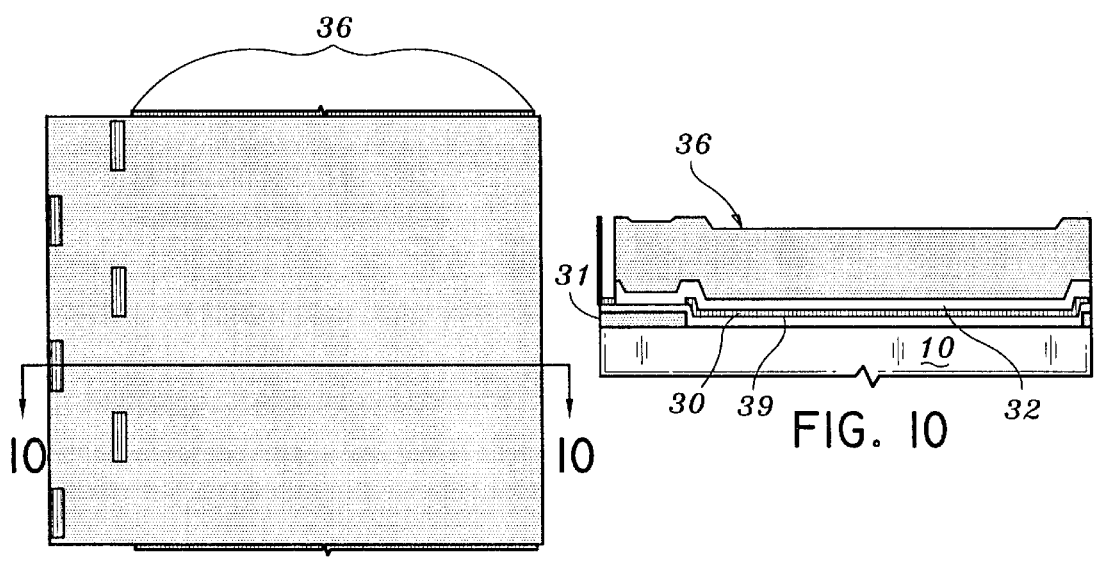
FIG. 9
FIG. 10
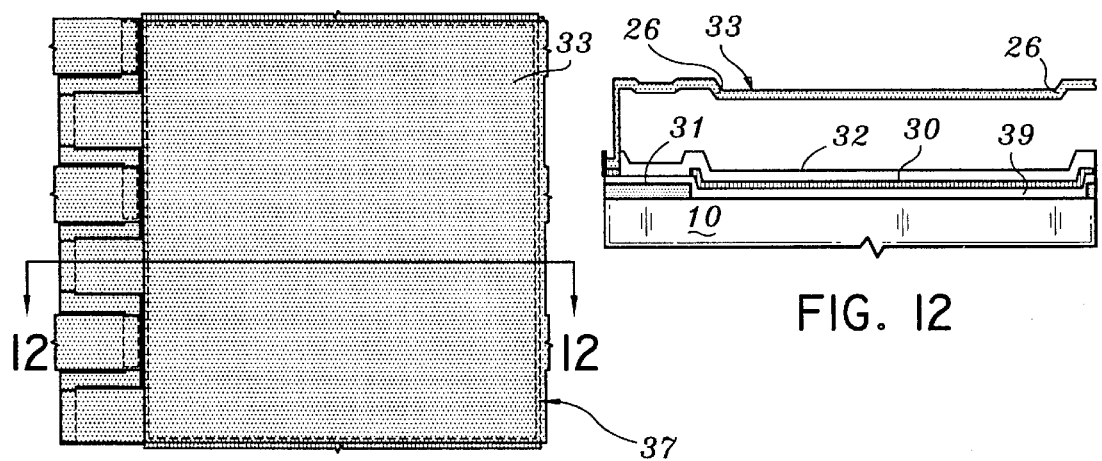
FIG. 11
FIG. 12

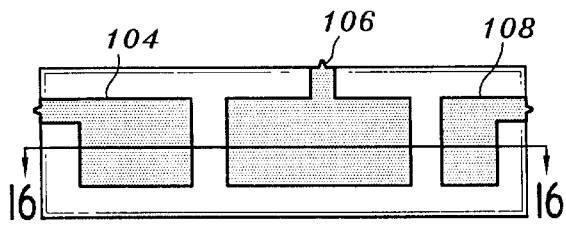
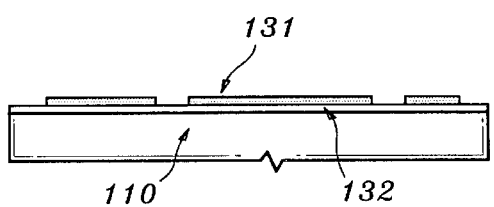
FIG. 15    FIG. 16
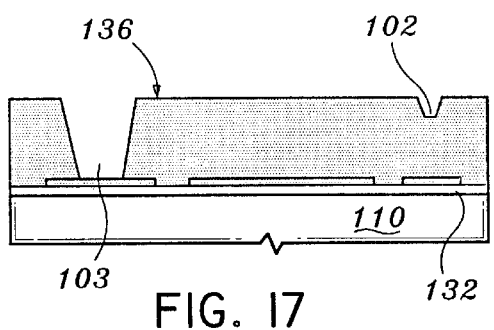
FIG. 17
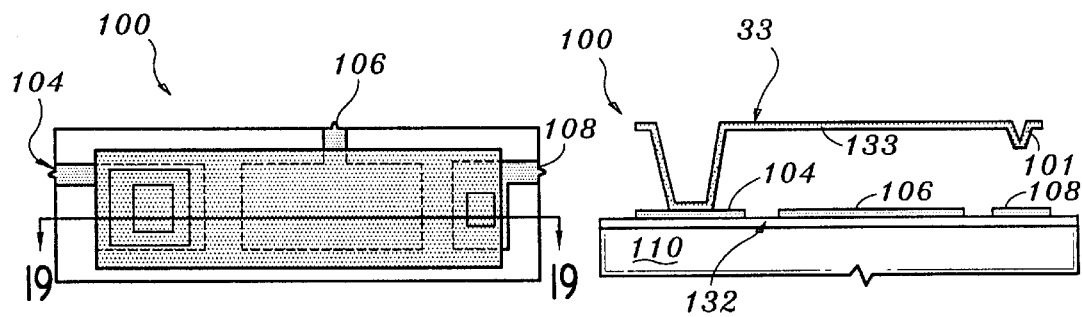
FIG. 18    FIG. 19

MICROMECHANICAL DISPLAY AND FABRICATION METHOD

This is a divisional of co-pending application Ser. No. 09/168,456 filed on Oct. 8, 1998.

BACKGROUND OF THE INVENTION

1. Field of the Invention

The present invention relates to micro-mechanical devices for reflective displays and, more particularly, to a reflective display having deformable mirrors.

2. Description of the Related Art

There are significant efforts underway to develop low power, high resolution, "paper-like" displays using either liquid crystals (T. Ogawa et al., "The Trends of reflective LCDs for future electronic paper", SID '98 Digest, p. 217) or other technologies. The liquid crystal based approaches generally suffer from low reflectivity and poor contrast ratios. There has recently been a number of publications on using MEM (microelectromechanical) devices for display applications. Projection systems based on arrays of tilting mirrors have been commercialized (See, e.g., J. Sampsell, "An overview of the digital micromirror device (DMD) and its application to projection displays", SID '93 Digest, p. 1012) and projection systems proposed using a micromechanical phase grating (See, e.g., D. Bloom "The grating light valve: revolutionizing display technology", SPIE Vol. 3013 (1997) p. 165).

Two types of MEM based direct view displays have also been proposed. In the first (See e.g., E. Stern, "Largearea micromechanical flat-panel display", SID 97 Digest, p. 230), an array of passively addressed bistable transparent beams are used to control the release of light trapped by total internal reflection. This device uses a back light, and due to the thick optical feed structure (about 4 cm) is not be suitable for portable displays. A second direct view display (See e.g., M. W. Miles, "A new reflective FPD technology using interferrometric modulation", SID 97 Digest (1997) p.71) includes the use of a micromachined deformable optical cavity whose reflected color changes with voltage. The device includes a self-supporting deformable membrane, made of, for example aluminum, and a thin film stack, both residing on a transparent substrate. The self-supporting deformable membrane and the thin film stack act as mirrors for an optically resonant cavity. When a voltage is applied, the deformable mirror collapses and the color of the reflected light is changed. The devices are binary and have hysteresis which allows passive addressing. The color selection of the two states is determined by the optical stack (which contains a conductor) and by the rest height of the deformable mirror. The main disadvantage of such a system is that the maximum reflectivity is limited. For a narrow color band, the peak reflectance can be about 80%. If an 80% reflectivity is assumed for the whole Red, Green, and Blue bands, a triad pixel structure, and an 80% aperture ratio, the maximum white reflectivity would be about 21%. For a paper-like display, a reflectivity of 40% or more is necessary.

A type of display, referred to as "electroscopic displays", have been described by T. S. Te Velde et al. which are bistable and have an improved reflectivity compared to the interferrometric modulation displays described above. (See Te Velde et al., "A family of electroscopic displays", Society of Information Display 1980 technical digest, p. 116–117 and the following U.S. Pat. Nos. 4,178,077, 4,519,676, 4,729,636.) The article entitled, "A family of electroscopic displays". (hereinafter Velde), describes an electroscopic fluid display where a plate or grid which is reflective and is movable is sealed with a glass plate and filled with a nonconducting black or other colored solvent. If the penetration depth of the incident light in the solvent is much smaller than the thickness of the cell, than when the white grid is located near the bottom plate, the grid will not be visible and the cell will appear black. However, when the white grid is attracted to the front side, the white grid will be visible and the cell will appear white.

Two possible configurations are described in Velde, a springy capacitor and a triode. For the springy capacitor, the grid is mechanically fastened to the bottom plate via conductive springs and when a large enough voltage is applied, the springs are stretched and the grid rushes to the upper electrode. This arrangement requires careful cell gap control since the threshold voltage is a function of the cell gap.

In the triode configuration, the springs are made very weak so that mechanical forces can be neglected and electrodes on the top and bottom plates are used to electrostatically control the position of the reflective plate. In U.S. Pat. No. 4,178,077, a triode configuration is described where electrostatic forces are used to control a movable electrode in an opaque liquid. A fabrication process is also described which uses an underetching process where apertures in a second layer provide access for the etchant to the first layer. This requires a timed etch to leave portions of the first layer in place to support the second layer. In U.S. Pat. No. 4,519,676, a triode configuration is again described, but with the resilient elements below the display part to increase the aperture ratio. A more complicated fabrication process is described which again uses timed underetching. In U.S. Pat. No. 4,729,636, engaging points are formed between the movable electrode and its engaging surface to improve the response time by allowing liquid flow in and out during closure and release. The triode configuration is complicated and requires electrical contacts for addressing to be formed on both top and bottom plates. Both the triode and springy capacitor (when fastened to the bottom plate) require precise cell gap control since the threshold voltage depends on the cell gap. The fabrication processes described require the etching step to be stopped by a certain time or the first layer will be fully removed and the second layer will no longer be attached to the substrate.

For a high information content display, such as one for an 8.5 inch by 11 inch sized display with 150 dot per inch resolution, it is advantageous to integrate some of the addressing electronics on the display itself to reduce cost and improve yield. For the display size described above, approximately 1,275 gate line and about 1,650 data line connections and driver chip outputs are needed. If the display technology used can also provide switches, the row selection circuits (i.e., shift register) and data driver demultiplexing circuits may be made with the display and greatly reduce the number of connections and drivers. (See "Silicon light valve array chip for high resolution reflective liquid crystal projection displays", by J. L. Sanford et al., IBM J. Res. Develop., Vol. 42 No. 3/4, May/June 1998, pp. 347–358, incorporated herein by reference.)

Therefore, a need exists for a portable display having high reflectivity and a high contrast ratio. A further need exists for a display which permits switches to be fabricated at the same time as the display device. A still further need exists for a method for fabricating the display device and switches in an efficient and economical manner.

SUMMARY OF THE INVENTION

A display device, in accordance with the present invention includes a transparent substrate and an array of pixels formed on the substrate, each pixel including a transparent electrode and a deformable member electrically actuated between a first state and a second state, wherein in the first state a liquid including a dye is disposed in a gap between the transparent electrode and the deformable member and wherein in the second state the deformable member contacts the transparent electrode to define an area of contact thereby closing the gap such that the liquid is substantially removed between the deformable layer and the transparent electrode in the area of contact. A plurality of switches is formed on the substrate for supplying control signals to the array of pixels to selectively actuate the deformable members of the pixels, wherein each switch comprises an actuating member movable between an active state and an inactive state, whereby in the active state any control signal supplied to the switch passes through the switch, and in the inactive state any control signal supplied to the switch is prevented from passing through the switch.

In alternate embodiments, the deformable member may include a reflective surface which contacts an insulation layer over the transparent electrode in the second state. The dye may be black such that light is reflected from the area of contact when the deformable member is in the second state and light is absorbed in the gap when the deformable member is in the first state. The dye may include Sudan Black or Naphthol Blue Black. The deformable member may include a light absorbent surface which contacts the transparent electrode in the second state. The dye may be white such that light is reflected from the gap when the deformable member is in the second state and light is absorbed in the area of contact when the deformable member is in the first state. The deformable member is bistable having a hysteresis such that only the first and second states are permitted. Alternatively, the deformable member may be adjustable between a plurality of states thereby adjusting the gap to provide reflected light on a grey scale (i.e., various intensities). The switches preferably include microelectromechanical switches and are formed simultaneously with the display elements.

In other embodiments, the deformable member is preferably actuated on hinges integrally formed with the deformable member. The device may include an active area which may include a first seal region for maintaining the liquid in the active area. The display device may further include a second seal region for maintaining an inert gas therein between the first seal region and the second seal region such that the plurality of switches exist in the inert gas. The transparent electrode may form a data line for controlling the pixels and the deformable member may form a gate line for controlling the pixels such that voltage differences provided by control signals between the gate line and the data line provide a force for actuating the deformable member. The plurality of switches may be formed on the substrate for supplying the control signals on gate lines and data lines to the array of pixels to selectively actuate the deformable members of the pixels. A shift register may be included using a portion of the plurality of switches, the shift register is employed for addressing the gate lines. Switches may also be employed for demultiplexing the data lines to reduce the number of data driver chips and electrical connections needed.

Another display device, in accordance with the invention includes a substrate and an array of pixels formed on the substrate, each pixel including a transparent substrate and a deformable member electrically actuated between a plurality of states. In each of the states, a liquid including a dye is disposed in a gap between the transparent substrate and the deformable member in an active area and wherein the gap is adjustable according to voltages applied to and stored by each pixel thereby reflecting light from the active area according to a grey scale (i.e., by varying the intensity of the reflected light).

In alternate embodiments, the deformable member may include a reflective surface for reflecting light through the transparent substrate and wherein the dye is black. The deformable member may include a light absorbent surface for absorbing light through the transparent substrate and wherein the dye is white. The deformable member is preferably actuated on hinges integrally formed with the deformable member. An active device area may be included, and a first seal region may also be included for maintaining the liquid in the active area. The display device may include a second seal region for maintaining an inert gas therein between the first seal region and the second seal region such that the plurality of switches exist in the inert gas. A shift register may be included, and a portion of a plurality of switches may be used to construct the shift register. The shift register is preferably for addressing gate lines which are used to activate switches in each pixel to connect the data lines to storage capacitors in each pixel. Switches may also be employed for demultiplexing the data lines to reduce the number of data driver chips and electrical connections needed. Data lines are independent of gate lines.

A method for fabricating a display device includes providing a top plate, patterning a transparent electrode in an active region on the top plate, forming an insulating layer on the transparent electrode, patterning a low reflectivity conductive material to form a source electrode, a gate electrode and a drain electrode on the insulating layer outside the active area, patterning a sacrificial layer, patterning a metal layer to form deformable members having a gap between the metal layer and the transparent electrode in the active area and switches outside the active area such that upon activating the gate electrode an electrical connection is made between the source electrode and the drain electrode, removing the sacrificial layer and filling the gap with a liquid including a dye such that in a first state of the deformable member the liquid is disposed in the gap between the transparent electrode and the deformable member and wherein in a second state the deformable member contacts the insulating layer over the transparent electrode to define an area of contact thereby closing the gap such that the liquid is substantially removed between the deformable layer and the insulating layer over the transparent electrode in the area of contact.

In alternate methods, the step of patterning the sacrificial layer preferably includes the steps of forming a via hole through the sacrificial layer to the source electrode and forming a tip feature hole over the drain electrode such that upon patterning the metal layer a cantilevered conductor is attached to the source electrode and includes a tip feature for contacting the drain electrode. The step of forming the source electrode, the gate electrode, the drain electrode and a black matrix concurrently from a low reflectivity conductive material may also be included.

Another method for fabricating a display device includes the steps of patterning a black matrix layer on a transparent substrate, depositing a first insulation layer on the patterned black matrix layer, patterning a transparent conductor layer on the first insulation layer, depositing a second insulation layer on the transparent conductor layer, depositing a sacrificial layer on the second insulation layer for forming a gap of a predetermined distance between the second insulation layer over the transparent conductor layer and deformable members, forming openings in the sacrificial layer for providing support points for deformable members, patterning a metal layer to form deformable members and removing the sacrificial layer to provide the gap.

In alternate methods, the step of filling the gap with a liquid including a dye such that in a first state of the deformable member the liquid is disposed in the gap between the transparent electrode and the deformable member and wherein in a second state the deformable member reduces the gap between the second insulation layer over the transparent electrode and the deformable member such that the liquid is substantially removed between the deformable member and the second insulation layer over the transparent electrode is preferably included. The sacrificial layer may include copper and the step of removing the sacrificial layer may include the step of removing the sacrificial layer by a wet etch process. The deformable members include deformable mirrors.

Yet another method for fabricating a deformable display device includes the steps of patterning a transparent conductor layer in an active area of a transparent substrate, forming an insulation layer over the transparent conductor layer, patterning a conductive black matrix layer on the insulation layer outside the active area, the black matrix layer used for forming a drain electrode for switches, providing a source electrode-and a gate electrode for switches by patterning one of the black matrix layer and the transparent conductor layer outside the active area, patterning a sacrificial layer for forming features in the sacrificial layer for providing support points for the deformable member's connections through the sacrificial layer (including tip features for the switches) and patterning a metal layer on the sacrificial layer to form the deformable members and support points for the deformable members, the deformable members including deformable display members in the active area and switches outside the active area, removing the sacrificial layer to provide a predetermined gap between the insulation layer over the transparent conductor and the deformable display members and to provide cantilevered conductors for the switches, the cantilevered conductors attaching to the source electrode and including a tip feature for contacting the drain electrode when the gate electrode is activated.

In other methods, the step of patterning a sacrificial layer may include the steps of forming a via hole through the sacrificial layer to the source electrode and forming a tip feature hole over the drain electrode such that upon patterning the metal layer the cantilevered conductor is attached to the source electrode and includes the tip feature for contacting the drain electrode. The sacrificial layer may include a conductive top portion and a lower insulating portion and may further include the steps of forming dimples in the top portion and in a portion of the bottom portion for forming the cantilevered conductors for switches and forming openings through the top and bottom portions to form vias through the sacrificial layer. The conductive top portion may include copper and the lower insulating portion may include polyimide, the method may further include the steps of removing the top portion with a wet etching process and removing the lower portion by a plasma etching process. The deformable display members preferably include deformable mirrors. The method may also include the step of filling the gap with a liquid including a dye such that in a first state of the deformable display member the liquid is disposed in the gap between the transparent electrode and the deformable display member and wherein in a second state the deformable display member reduces the gap between the insulation over the transparent electrode and the deformable display member such that the liquid is substantially removed between the deformable display member and the transparent electrode.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIGS. 5 and 6 are a top plan view and cross-sectional view, respectively, showing a black matrix layer and an insulating layer deposited on a top plate in accordance with the present invention;

FIGS. 7 is a top plan view showing a transparent electrode layer and an additional insulating layer deposited on the insulating layer of FIG. 6 in accordance with the present invention;

FIG. 8 is a cross-sectional view of a section taken along section line 8—8 of FIG. 7.

FIGS. 9 and 10 are a top plan view and cross-sectional view, respectively, showing a sacrificial layer deposited and patterned on the device of FIG. 8 in accordance with the present invention;

FIGS. 11 and 12 are a top plan view and cross-sectional view, respectively, showing the sacrificial layer of FIGS. 9 and 10 removed and a metal layer used to form deformable mirrors and switches deposited in accordance with the present invention;

FIGS. 15 and 16 are a top plan view and cross-sectional view, respectively, showing a conductor deposited in accordance with the present invention;

FIG. 17 is a cross-sectional view showing a sacrificial layer deposited and patterned on the device of FIG. 16 in accordance with the present invention;

FIGS. 18 and 19 are a top plan view and cross-sectional view, respectively, showing the sacrificial layer of FIG. 17 removed and a metal layer used to form deformable mirrors and switches deposited in accordance with the present invention;

DETAILED DESCRIPTION OF PREFERRED EMBODIMENTS

The present invention includes an electrically actuated self supporting deformable mirror which is operated in a liquid which includes a dye to form a reflective "paper-like" display. The deformable mirror is made by surface micromachining methods and has hysteresis so that passive addressing can be used. The deformable mirrors are formed on a top substrate of the display so that a gap is advantageously determined by the thickness of a sacrificial layer.

The invention also includes the operation of the micromachined deformable mirrors in the fluid containing the dye. One advantage of using the dye is that a black and white display with high reflectivity and good contrast ratio is formed where the dye provides the black state when the deformable mirrors are in a relaxed state. When the mirrors are collapsed against a transparent substrate (displacing the black dye), a high reflectivity metal such as Al or Ag provides a bright white state. A gap between the deformable mirror and top glass of about 2–3 microns exists to permit flexure of the mirror.

Assuming a reflectivity of about 90% and an aperture ratio of about 80%, a brightness of about 72% is achievable.

Further, the fabrication process includes few masking steps which permit reduced manufacturing costs. With an additional masking step, the process is compatible with microelectromechanical (MEM) switches. The following describe MEM switches and are incorporated herein by reference: P. M. Zavracky, S. Majumder and N. E. McGruer, "Micromechanical Switches Fabricated using Ni surface micromachining", Journal of Microelectromechanical systems, Vol. 6 No. 1 (1997) p. 3; U.S. Pat. No. 4,674,180 to P. M. Zavracky et al.; and U.S. Pat. No. 5,638,946 P. M. Zavracky. The MEM switches described in the above documents may be used for some of the addressing circuits such as a shift register for addressing gate lines and data demultiplexing to reduce the number of required contacts in these devices. This is desirable for an economically feasible high information content display where individual electrical contacts for each gate and data line to the associated driver chips increase total display costs.

Figure 1:
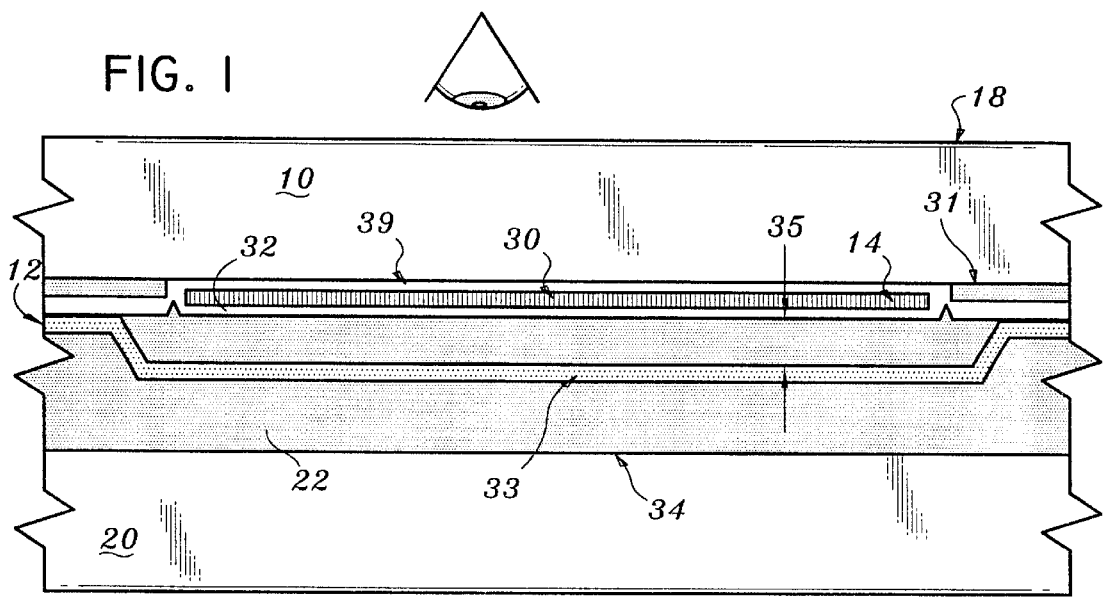
FIG. 1 is a cross-sectional view of an embodiment in accordance with the present invention with a deformable mirror in a relaxed state.
Figure 2:
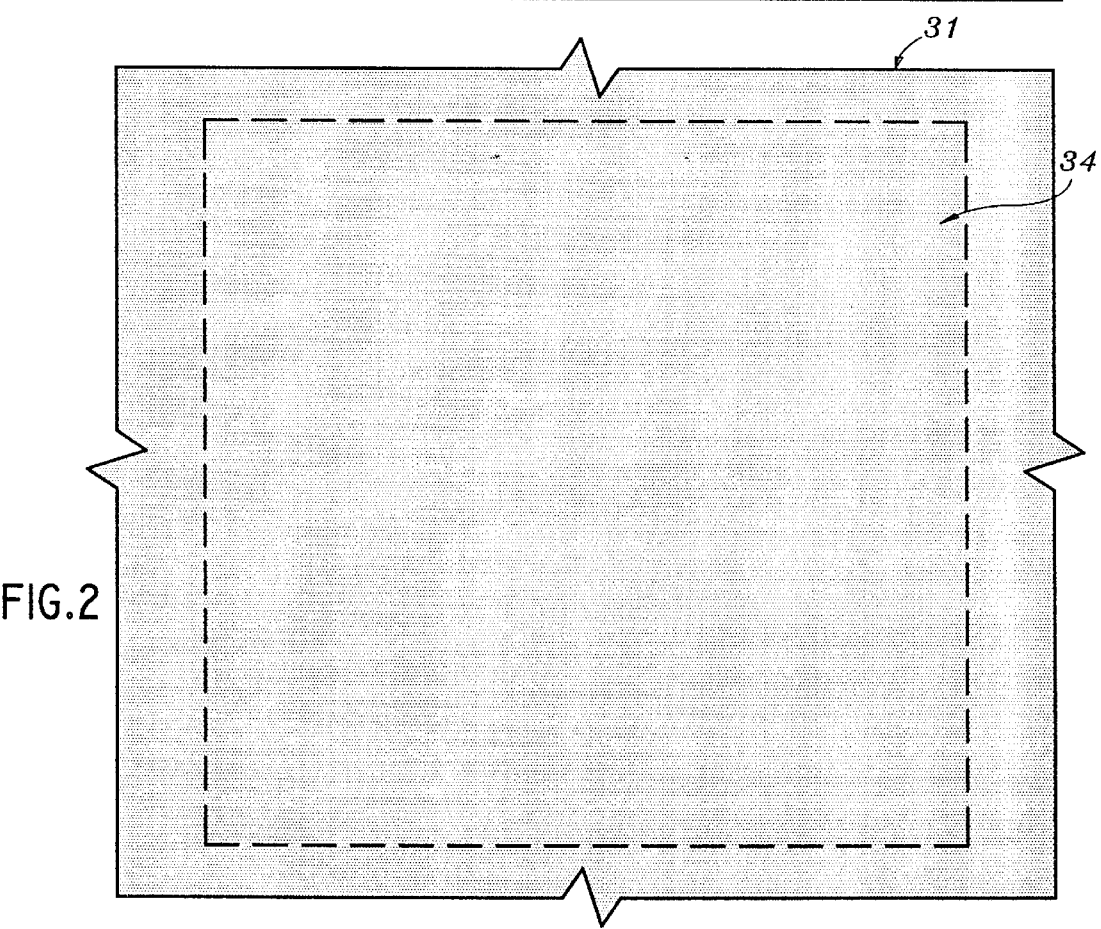
FIG. 2 is a top plan view of the embodiment of FIG. 1 in accordance with the present invention with a deformable mirror in a relaxed state.
Figure 3:
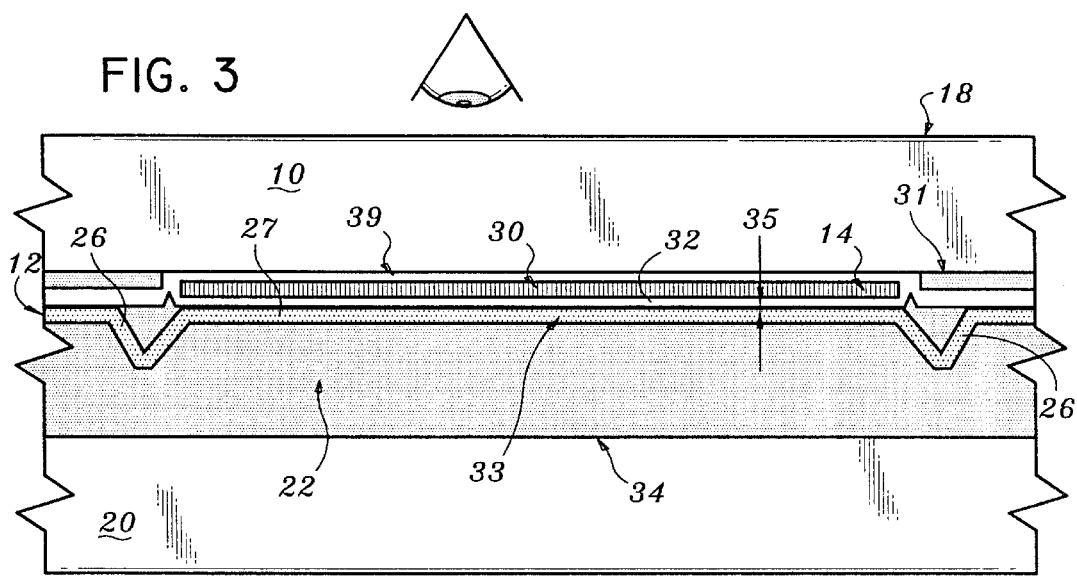
FIG. 3 is a cross-sectional view of the embodiment of FIG. 1 in accordance with the present invention with a deformable mirror in a collapsed state.

Referring to the figures in which like numerals represent the same or similar elements and initially to FIGS. 1 and 2, a display element 18 is shown in a relaxed state in accordance with the present invention. In a preferred embodiment a gate line 12 is provided using deformable mirrors 33 which may be electrically interconnected to form gate lines 12. Further, a combination of voltages, may be applied to data lines 14, which may formed by a continuous stripe of a transparent conductive electrode 30, such as an indium-tin oxide electrode. Deformable mirror 33 may include at least two positions. One position is a relaxed position (FIG. 1) and another is a collapsed position (FIG. 3). In one embodiment, the relaxed position corresponds to an applied voltage less than a voltage (threshold voltage) needed to pull deformable mirror 33 down, i.e. to collapse it. With deformable mirror 33 in the relaxed position, a gap 35 between mirror, 33, and an insulator layer 32 is occupied by a black dye 34.

Black dye 34 has a high optical extinction coefficient, is a good electrical insulator, has a high dielectric constant to lower the threshold voltage for the mirrors and has a low viscosity. Black dye 34 may include a single or combination of disazo dyes dissolved in a solvent such as EGME (2-methoxyethanol), acetone, toluene, etc. A preferred dye may be Sudan Black B (also known as flat black BB or Solvent Black 3). Another possible disazo dye is Naphthol Blue Black (also known as Acid Black 1 or Amido Black 10B).

Using Sudan Black B, with a gap thickness of about 3 um, the reflected light in the dark state would be about 1.6%. For Naphthol Blue Black, with a gap thickness of about 2 um, the reflected light in the dark state would be about 1.2%. If the reflectivity of the mirror is 80%, the contrast ratio of the active area of the pixels would range from about 50 to about 67. Note that the display operation does not require that absolutely all of the dye be removed from between deformable mirror 33 and insulator layer 32 when the mirror is in the collapsed state. Using Sudan Black B, if a gap of, for example, 100 nm remains in the collapsed state, the reflected light would be about 87% of the brightness of reflected light if the gap was completely empty of dye. This would degrade the brightness and contrast ratio slightly but could be acceptable for many applications.

As shown in FIG. 2, black dye 34 absorbs light which is transmitted through a top glass 10, a transparent insulator 39 and transparent electrode 30. Any remaining light is reflected by deformable mirror 33 back through black dye 34. This results in little or no light being reflected back to the viewer through the top plate 10. Black dye 34 may be disposed in a reservoir 22 between deformable mirror 33 and a substrate 20. A black matrix layer 31 is also included to absorb light in regions surrounding transparent electrode 30.

Figure 4:
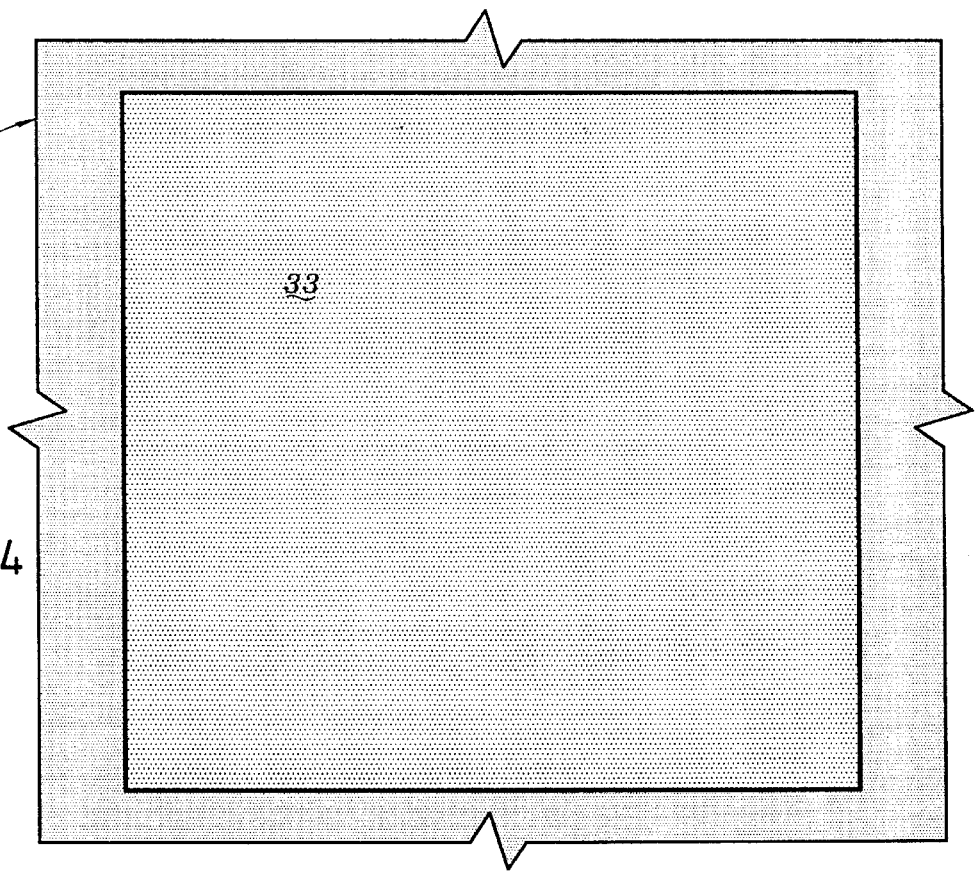
FIG. 4 is a top plan view of the embodiment of FIG. 1 in accordance with the present invention with the deformable mirror in the collapsed state.

Referring to FIGS. 3 and 4, element 18 is shown in a collapsed state where the combination of the voltage applied to gate line 12 and to data line 14 is above the threshold voltage necessary to collapse mirror 33. When mirror 33 is collapsed, a mirror portion 27 moves toward insulator 32 on integrally formed hinges 26, black dye 34 is displaced from gap 35 and any light transmitted through top plate 10, transparent electrode 30, and insulator layers 32 and 39 is reflected by mirror 33. As shown in FIG. 4, a pixel (mirror 33) appears bright when viewed through top plate 10. If gaps 35 and reservoirs 22 do not provide adequate area for rapid transport of black dye 34, i.e. dye displacement, additional openings can be made in the deformable mirrors. The displaced dye moves into reservoir 22 between deformable mirror 33 and substrate 20. Reservoir 22 provides a region for which dye is displaced into as individual deformable mirrors are collapsed or from which dye is provided as individual deformable mirrors return to the relaxed position.

Referring to FIGS. 5–12, the processing steps for fabricating the deformable mirrors of the present invention wherein MEM switches are not included is shown. Referring to FIGS. 5 and 6, a black matrix layer 31 is deposited on top plate 10. Top plate 10 may include a glass such as silicon based glass. Black matrix layer 31 preferably includes a low reflectivity material, preferably formed of chromium oxide ($Cr_xO_y$) and/or chromium (Cr), to reduce the reflection of light from the areas outside of an active pixel region. Black matrix layer 31 may be conductive. Black matrix layer 31 may be patterned by standard lithography and wet etching techniques and overcoated with a conformally deposited transparent insulator layer 39 such as silicon oxide ($SiO_2$) or Silicon Nitride ($SiN_x$). As shown in FIGS. 7 and 8, transparent electrode 30 is formed by depositing a transparent conductive layer, preferably indium-tin oxide (ITO), or another transparent conductor, to form data lines 14. Transparent electrode 30 is patterned by lithography and wet or dry etching and overcoated with an insulator 32 which is also transparent.

As shown in FIGS. 9 and 10, the deposition of a sacrificial layer 36 with a thickness equal to the desired thickness of gap 35 (FIG. 1) is performed. Sacrificial layer 36 may include a material such as sputtered copper (Cu), or Cu plated into a conducting seed layer. Sacrificial layer 36 may be textured on its surface which contacts mirror 33 to provide diffuse reflectivity for the mirror when formed in the subsequent steps. The thickness of sacrificial layer 36 determines the distance of the gap, 35, between deformable mirror 31 and insulator layer 32 on top plate 10 when the mirror is in the relaxed position (See FIG. 1). Sacrificial layer 36 is patterned as shown in FIG. 9 by coating the device with a photoresist, exposing and developing the resist, and using a suitable wet etch. A mixture of phosphoric acid, acetic acid, nitric acid and water in the ratios of about 80%/5%/5%/10%, respectively, for example, may be used to perform the wet etch. Insulator layer 32 adjacent to sacrificial layer 36 is preferably patterned at the same time as sacrificial layer 36 using wet or dry etching after which the photoresist is removed. In this example, transparent electrode 30 is used as an etch stop so that only insulator 32 is patterned, and not insulator layer 39. Also, this ensures deformable mirror 33 is not electrically connected to black matrix layer 31 as will be apparent from FIG. 12.

Referring to FIGS. 11 and 12, a photoresist layer is deposited and patterned over sacrificial layer 36. Deformable mirrors 33 are formed by plating in exposed conductor pattern areas created by the photoresist to form a metal layer 37. The photoresist is spun on and patterned to define the mask for plating mirrors 33, hinges 26, and other areas where the metal used for the deformable mirrors is desired. The patterned photoresist is baked at about 150° C. to improve its chemical resistance during the plating step(s). Preferably, a preclean is performed in about 10% aqueous hydrochloric acid prior to plating. The metal layer may include nickel (Ni) deposited to the desired thickness by electroplating from a commercial electroplating solution containing Ni. One alternative is to plate an initial layer of silver (Ag) prior to the Ni plating. Other metals are contemplated for the metal layer, for example aluminum (Al). After the metal layer is plated, the photoresist layer is stripped and a selective wet etch is used to remove sacrificial layer 36 but not etch the metal layer. It is to be understood that the present invention does not employ timed etching processes. Overetching will not damage the structure or render it nonfunctional as described above in the prior art.

If copper (Cu) is used for sacrificial layer 36 and Ni for the metal layer, sacrificial layer 36 may be etched in a mixture of approximately 40 parts water, 1 part hydrogen peroxide, and 8 parts ammonium hydroxide without damage to the Ni, for example. If a Ag layer has not already been added and higher reflectivity mirror is desired, the Ni metal layer can be electroplated with Ag after sacrificial layer 36 is removed. The pattern in which the metal layer is plated produces deformable mirror 33 with hinges 26 on at least two sides.

Figure 13:
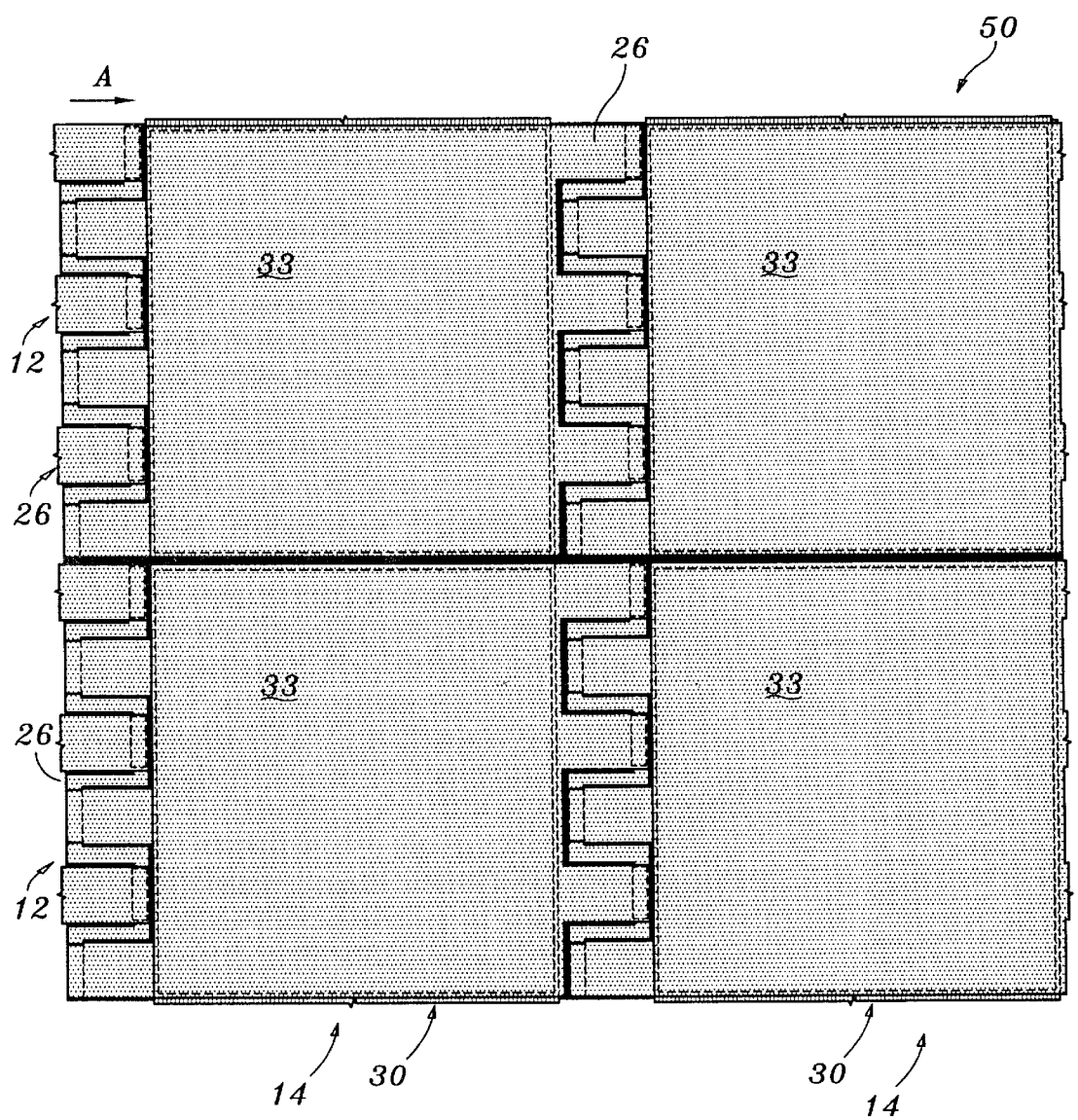
FIG. 13 is a top plan view of four pixels in accordance with the present invention.

Referring to FIG. 13, deformable mirrors 33 for each pixel are electrically interconnected to the adjoining deformable mirrors 33 in the direction of arrow "A" through hinges 26 to form individual gate lines 12. Deformable mirrors 33 are electrically isolated from transparent electrodes 30 (FIG. 12). Segments of transparent electrodes 30 in each pixel are electrically interconnected to the adjoining segments of transparent electrodes 30 in the vertical direction to form the individual data lines 14. Thus, an array of pixels 50 is formed on top plate 10. Array of pixels 50 is electrically connected by gate lines 12 and data lines 14 to which driver chips can be attached at the edges (at the end of the array). Data lines 14 and mirror metal gate lines 12 are extended beyond the active display area and past a glue seal region at the periphery of the array to electrically connect with bond pads in a tab area (formed either of ITO, gate metal, black matrix material, or a combination of these conductive layers) where driver chips can subsequently be attached by the use of anisotropic conductive film (ACF) or other techniques.

Figure 14:
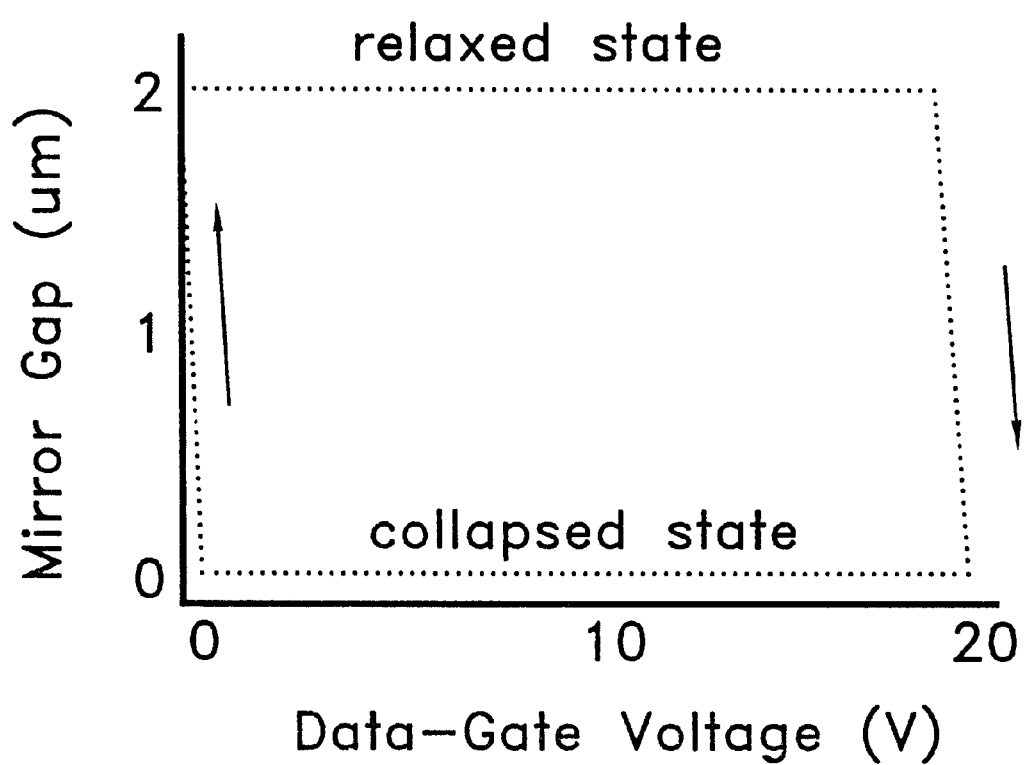
FIG. 14 is a plot of mirror gap versus drive voltage in accordance with the present invention.

Referring to FIG. 14, a display device having array of pixels 50 is addressed according to the present invention by sequentially selecting each of the gate lines and using the data lines to address each of the pixels on the selected gate line. The needed addressing voltages can best be understood with reference to FIG. 14 which shows a schematic of mirror gap 35 versus the data to gate voltage. In a preferred embodiment, the threshold voltage for collapse of the mirror "Vm(cp)" is about 19V and the threshold voltage for release "Vm(rl)" of a collapsed mirror is about 1 V. The actual magnitude of the threshold voltage for collapsing the deformable mirror and the mirror gap value is illustratively shown in FIG. 14. The selected gate line is held at "Vg(on)" and the gate lines not being addressed are held at "Vg(hold)". The data voltages are "Vd(on)" for a white pixel (collapse position of deformable mirror) and "Vd(off)" for a black pixel (relaxed position of deformable mirror). The combination of the Vg(on) and Vg(hold) and the Vd(on) and Vd(off) are selected so that:

Vg(on)+Vd(on)>Vm(cp)Vg(on)+
 Vd(off)<Vm(cp)Vm(rl)<Vg(hold)+Vd(on or off)<Vm(cp)

Appropriate drive voltage values for the above case may be, for example: Vg(on)=15 V, Vg(hold)=5 V, Vd(on)=10 V, and Vd(off)=0 V. Prior to selecting a line and writing the data to it, it is necessary to release any collapsed mirrors. This may be accomplished by applying "Vg(clear)" to the next line to be addressed just prior to selecting it where:

Vg(clear)+Vd(on or off)<Vm(rl)

or, alternatively, when selecting a line, prior to application of Vg(on), Vg(clear) can be applied while setting the data voltages to Vd(clear) such that:

Vg(clear)+Vd(clear)<Vm(rl)

Since display elements 18 are bistable (i.e. have hysteresis as shown in FIG. 14), advantageously, there is no degradation of contrast ratio as the number of lines is increased as is found for passive matrix liquid crystal displays. In other embodiments, mirror gap is varied proportionally with the data-gate voltage to provide a non-hysteresis mode wherein light may be reflected according to a grey scale (varying intensities of light), i.e., proportionally with the gap.

Referring now to FIGS. 15–19, the processing steps to fabricate an alternate embodiment of the present invention are described. Microelectromechanical (MEM) switches are provided outside an array of pixels to reduce the number of driver chips and electrical-contacts needed. FIGS. 15–19 show the fabrication of an MEM switch only. The processing for the pixels is the same as shown and described above except that transparent electrode 30 is patterned first, an insulator 32 is deposited, and when black matrix layer 31 is patterned, black matrix layer 31 is segmented and used to provide redundancy for the gate lines. This change ensures that there is no insulator over black matrix layer 31 so that black matrix layer 31 can be used for a drain contact pad. Also, a lithography step is used to define a tip feature region of the MEM switches. Contacts to the data lines are formed using the mirror metal. The MEM switches are fabricated concurrently with the deformable mirrors in accordance with the present invention.

Referring to FIGS. 15 and 16, the fabrication of an MEM switch 100 begins by patterning a conductive layer 131 to form a source 104, gate 106, and drain 108 of the switch on an insulator 132 and a top plate 110. Source 104, gate 106 and drain 108 may be patterned from different layers. Drain 108 is preferably patterned from the black matrix but source 104 and gate 106 may be patterned either from the ITO or the conductive black matrix layer. If ITO is used for source 104, the insulator layer over source 104 is removed during processing so that deformable mirror 133 makes electrical contact with source 104. The black matrix material or transparent electrode material for source 104, gate 106, and drain 108 is preferably deposited concurrently with the similar materials included for the active areas, i.e., for processing the deformable mirrors.

As shown in FIG. 17, a sacrificial layer 136 is deposited. Two patterning steps are preferably used to first open a switch tip feature 102 preferably to a depth of slightly greater than about ⅔ of sacrificial layer 136 thickness, and to second open sacrificial layer 36 fully down to black matrix layer 131 to form a source contact hole 103. The depth of switch tip feature 102 is adequate to ensure that switch 100 operates in a non-hysteresis mode.

Referring to FIGS. 18 and 19, a metal is deposited as described above to form an actuating member 133. A voltage applied between gate 106 and source 104 (to which actuating member 133 is cantilevered from) of the MEM switch which exceeds the threshold voltage actuates switch 100. Switch 100 closure shorts tip feature 101 of actuating member 133 to drain 108, thereby electrically connecting source 104 and drain 108. When the applied voltage is reduced below the threshold voltage, switch 100 opens up and source 104 and drain 108 are again electrically isolated. Further details on these processing steps and the operation of MEM shunts can be found in Zavracky et al.

Figure 20:
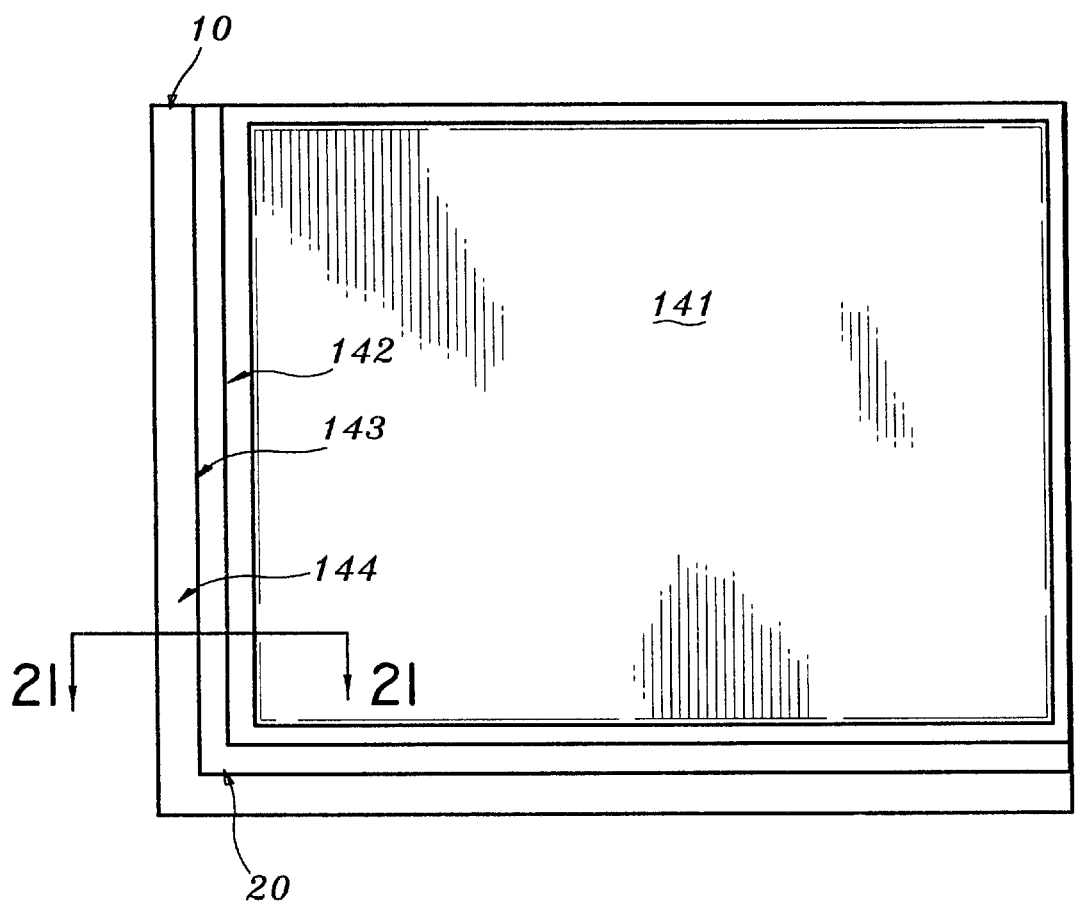
FIG. 20 is a schematic diagram of an assembled display in accordance with the present invention.
Figure 21:
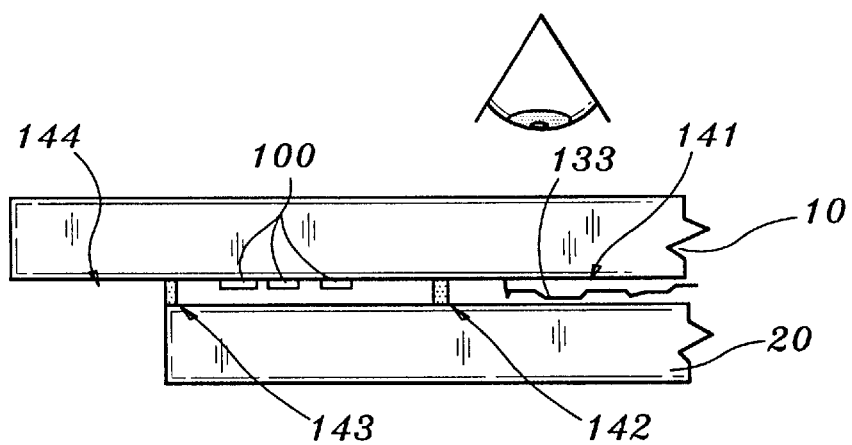
FIG. 21 is a partial cross-sectional view taken along section line 21—21 of FIG. 20 in accordance with the present invention.

An assembled display is shown schematically in FIGS. 20 and 21 for the embodiment with integrated MEM switches. A top plate 10 has deformable mirrors in a display or active area 141. Top plate 10 includes MEM switches 100 along one or more edges to form a shift register to address the gate lines. Also included are additional MEM switches to demultiplex data signals on the data lines. Top plate 10 is attached to substrate 20 using a glue seal region formed from materials such as epoxy. In the case of integrated MEM switches, two separate regions may be formed between top plate 10 and bottom plate 20. One region includes a dye glue seal 142 which includes deformable mirrors 133 to be used in conjunction with dye and another region including the MEM switches includes dry nitrogen or another inert gas and is sealed by a gas glue seal 143. This is advantageous as the switches operate faster in gas than liquid due to the lower viscosity of gas. External to region 143 is a tab region 144 where external drivers may be attached to metal bond pads or other connectors.

Figure 22:
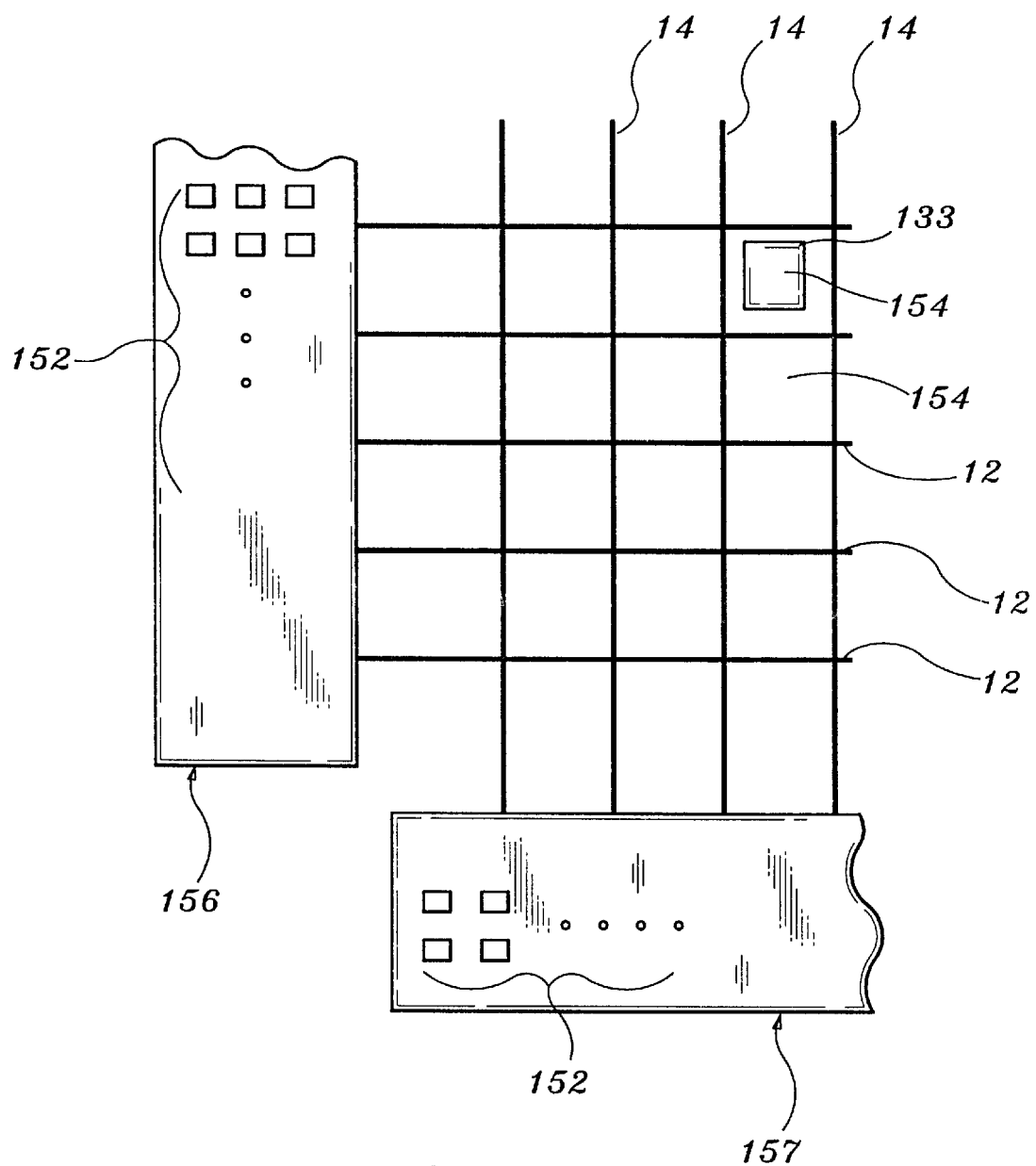
FIG. 22 is a schematic diagram showing a shift register and data multiplexing circuits constructed from MEM switches in accordance with the present invention.

Referring to FIG. 22, one embodiment of a display 150 in accordance with the present invention is shown. Display 150 includes an array of pixels 154 including deformable mirrors 133. Integrated MEM switches 152 form a shift register 156 to address gate lines 12. Integrated MEM switches 152 may also form circuits 157 to demultiplex data signals on data lines 14. This reduces the number of electrical contacts needed. Deformable mirrors 133 and switches 152 are formed concurrently during device fabrication. The display devices and switches used are both fabricated with the same process steps and are both electrostatically actuated with a mechanical restoring force, but the switches are constrained by the tip feature to operate in a non-hysteresis mode whereas the display elements are not constrained and hence are bistable.

Figure 23:
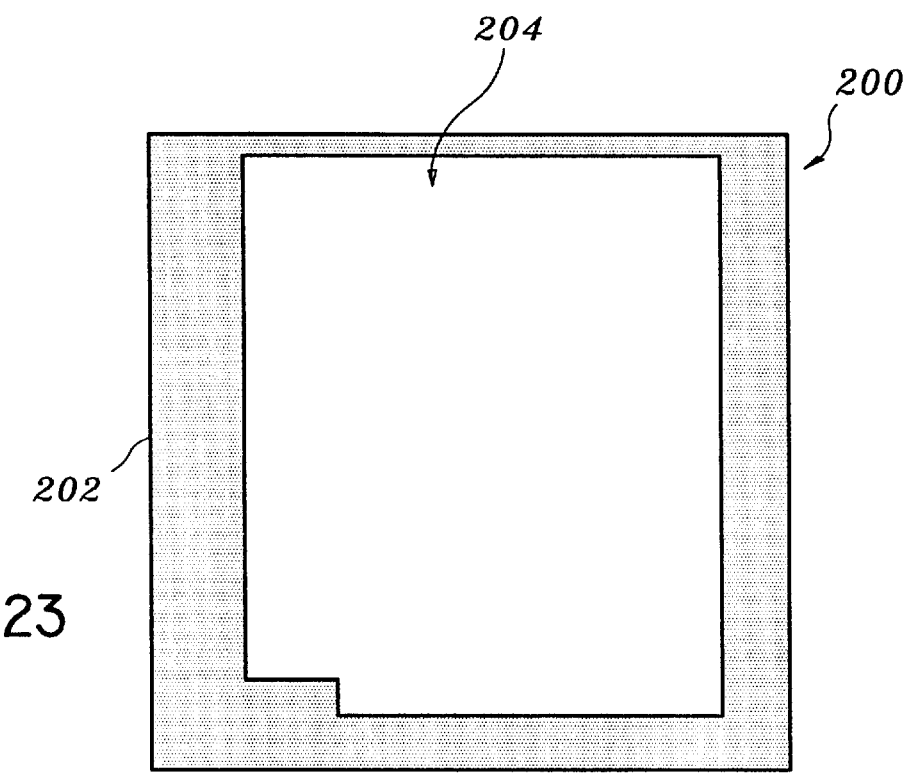
FIG. 23 is a top plan view of a display pixel having a black matrix material deposited and patterned on a transparent substrate and covered by a blanket insulation layer in accordance with the present invention.
Figure 24:
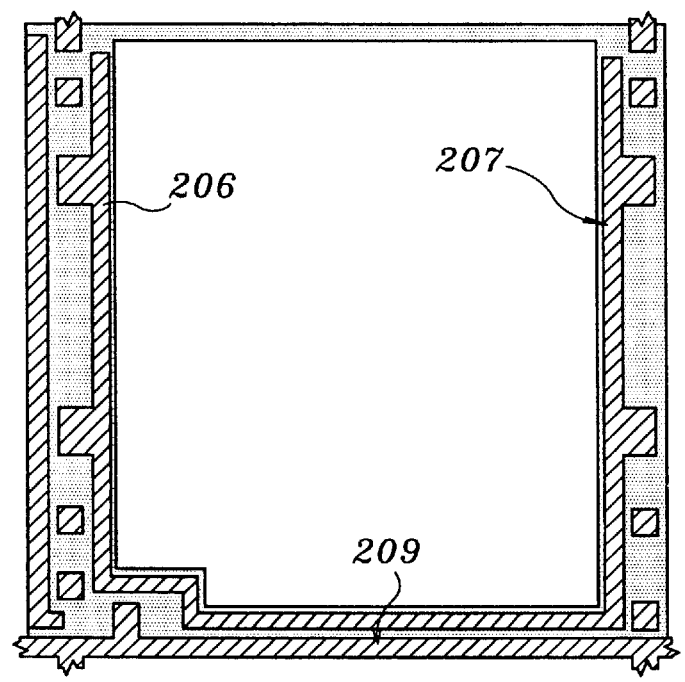
FIG. 24 is a top plan view of the display pixel of FIG. 23 having a gate metal deposited and patterned thereon in accordance with the present invention.
Figure 25:
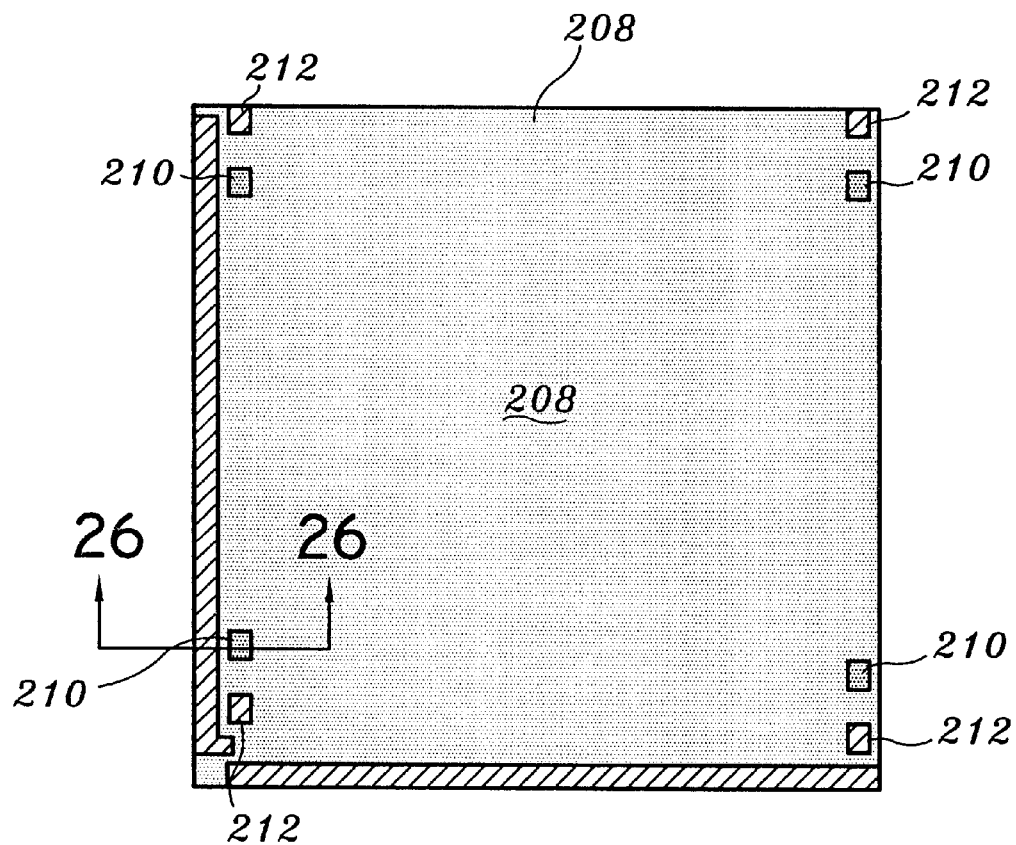
FIG. 25 is a top plan view of the display pixel of FIG. 24 having a sacrificial layer deposited and patterned thereon, the sacrificial layer shows dimples and hole for features to be formed in later processing steps in accordance with the present invention.
Figure 26:
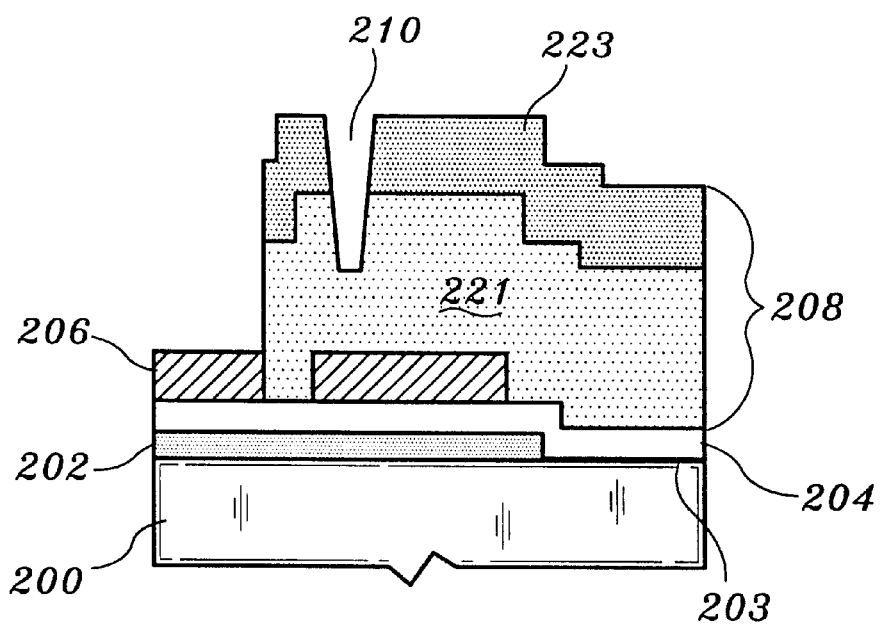
FIG. 26 is a cross-sectional view of the display pixel of FIG. 25 taken at section line 26—26 of FIG. 25 in accordance the present invention.

Referring to FIGS. 23–31, in an alternative embodiment of a reflective display, an active matrix is used and the deformable member may be adjusted to a number of positions to vary the intensity of the reflected light. A top plan view and their respective cross-sections of a single pixel are shown in FIGS. 23–31. The processing steps and structure are similar to those described above. In FIG. 23, a conductive black matrix (BM) 202 is deposited and patterned on a transparent substrate 200. Transparent substrate 200 includes a thin insulating layer 203 thereon (FIG. 26). Black matrix 202 is covered with a transparent insulator layer 204. In FIG. 24, a gate metal layer 206 is deposited and patterned by conventional methods such as plating Ni on a seed layer in patterned resist and subsequently removing the resist and seed layer to form portion of a storage capacitor 207 and gate lines 209. In FIGS. 25 and 26, a sacrificial layer 208 is deposited and patterned. Sacrificial layer 208 preferably includes two layers. A bottom portion 221 may include ⅔ or more of the total thickness of sacrificial layer 208 which is preferably polyimide (a transparent polymer), and a top portion 223 may include ⅓ or less of the total thickness of sacrificial layer 208 which is preferably copper. The tip regions 210 are formed by patterning the copper layer and part of the polymide layer so that the tip depth is about ⅔ of or greater than the total gap thickness. Via holes 212 are patterned through both the copper, polyimide layer and insulation stopping at the gate metal or BM layers.

Figure 27:
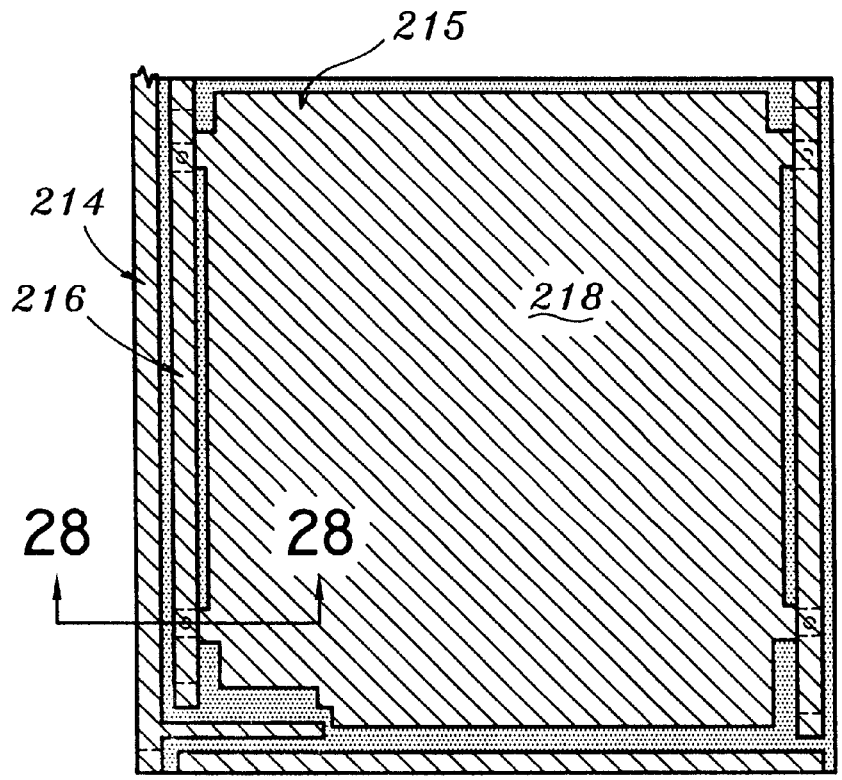
FIG. 27 is a top plan view of the display pixel of FIG. 25 having a data metal/deformable member metal deposited and patterned thereon in accordance with the present invention.
Figure 28:
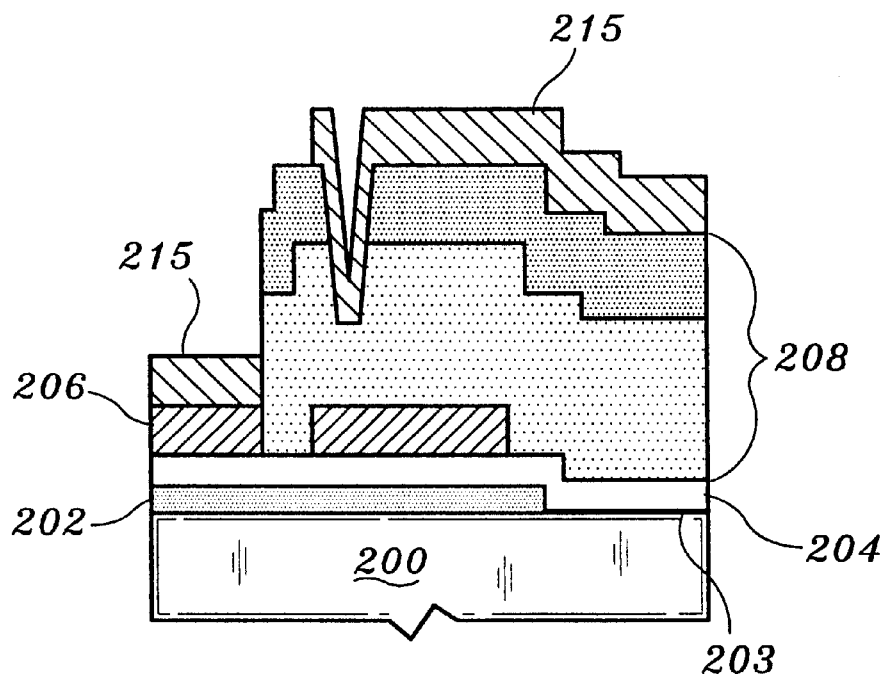
FIG. 28 is a cross-sectional view of the display pixel of FIG. 27 taken at section line 28—28 of FIG. 27 in accordance the present invention.
Figure 29:
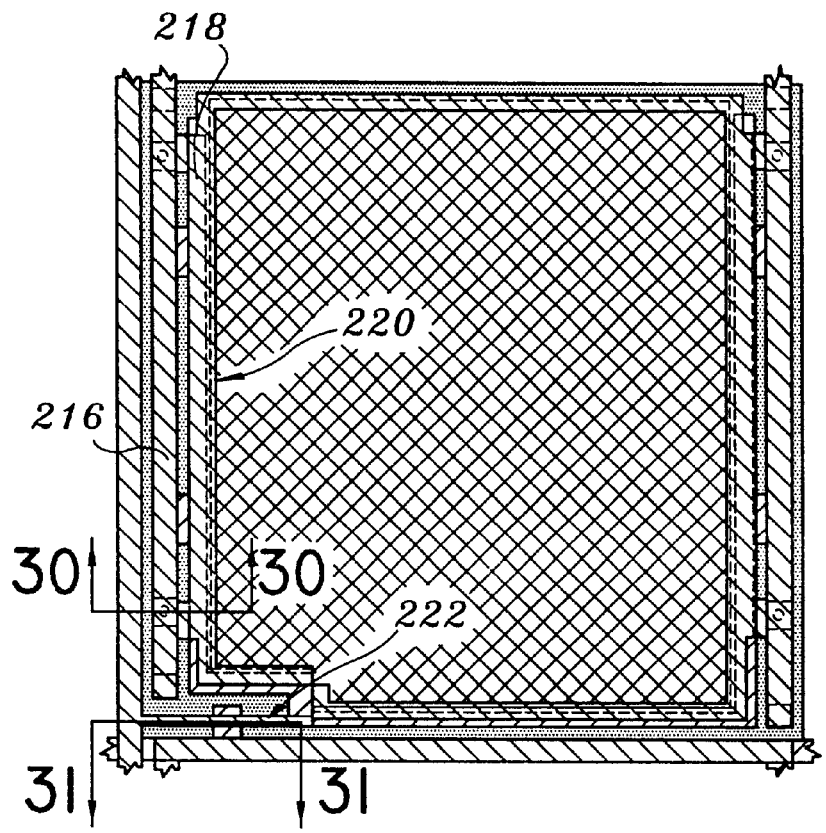
FIG. 29 is a top plan view of the display pixel of FIG. 27 showing a switch and a deformable mirror formed after the sacrificial layer etching in accordance with the present invention.
Figure 30:
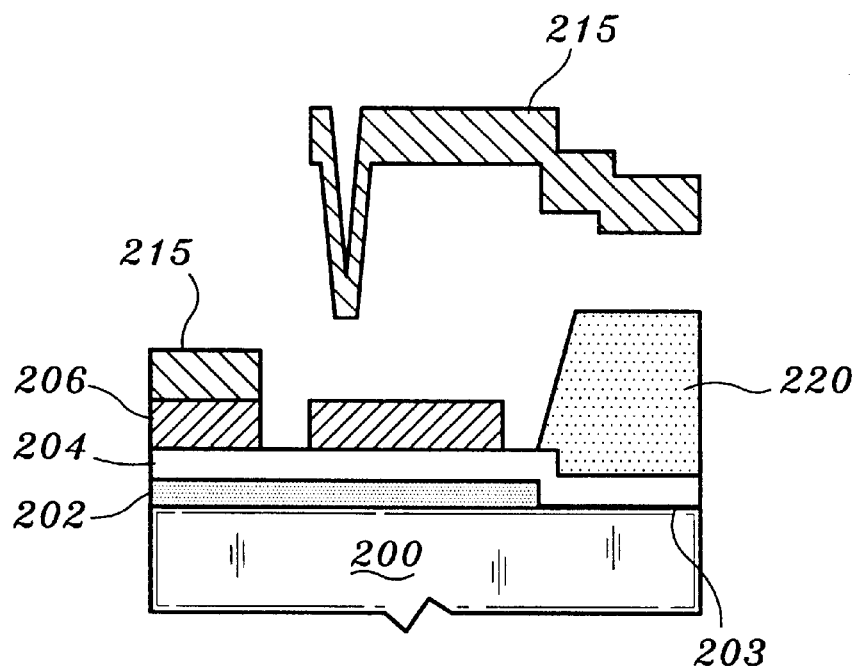
FIG. 30 is a cross-sectional view of the display pixel of FIG. 29 taken at section line 30—30 of FIG. 29 in accordance the present invention.
Figure 31:
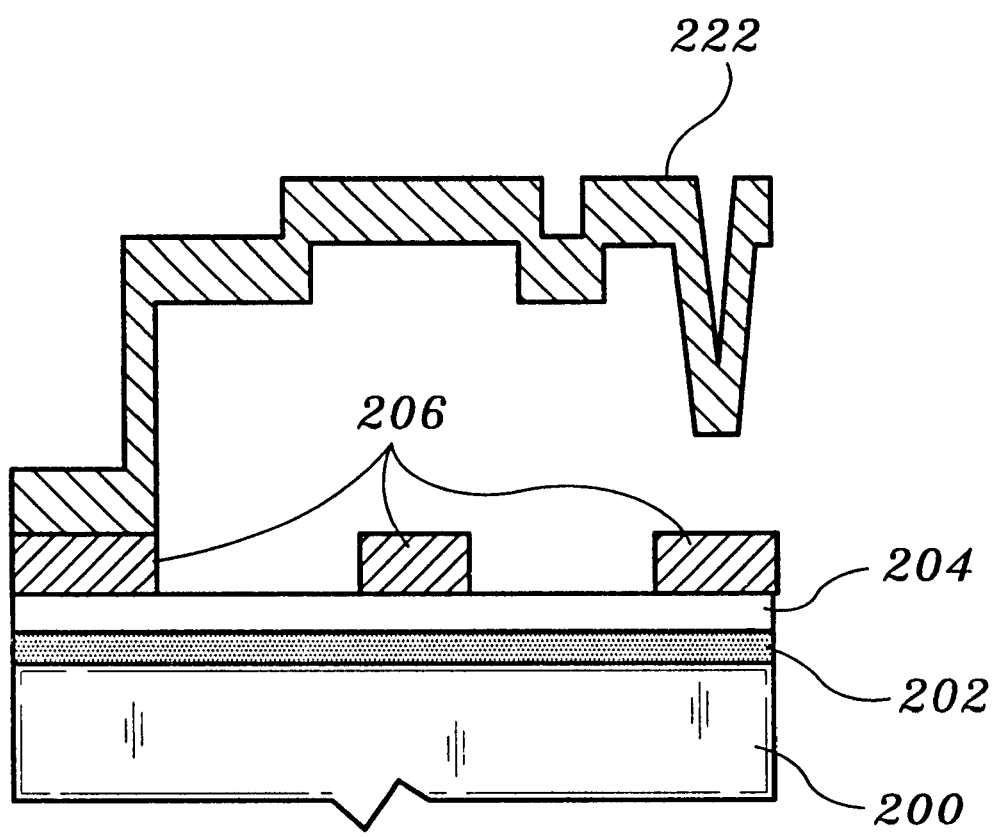
FIG. 31 is a cross-sectional view of the display pixel of FIG. 29 taken at section line 31—31 of FIG. 29 in accordance the present invention.

In FIGS. 27 and 28, conductive material for data lines 214 and deformable beams or hinges 216 are patterned by plating in patterned resist, using a metal 215 such as Ni. Than sacrificial layer 208 is removed by selective wet etching (top copper portion) and the polyimide layer (bottom portion) is selectively removed by plasma etching except in a region under a deformable mirror 218 where the polyimide remains to form a spacer 220 as shown in FIGS. 29 and 30. The plasma etching of polyimide can be directional, depending on the process conditions used, and proceeds is laterally under the deformable metal features at a controlled rate. This allows the polyimide to be removed from under narrow features such as switches 222, shown in FIG. 31, or bending beams (hinges) 216 but not from under large features such as deformable mirror 218. As an alternative, sacrificial layer 208 may include a bottom ⅓ or less of copper and a top ⅔ or more of polyimide. In this case, polyimide spacers 220 is attached to the bottom of deformable mirror 218 and the polyimide is etched first and the copper second where the tip features is only patterned in the polyimide layer.

Deformable mirror 218 is constrained by the polyimide to a non-hysteresis mode where the gap is controlled by the voltage stored on storage capacitor 207. Storage capacitor 207 is formed between the gate metal and the black matrix. Electrical contacts to the black matrix are formed outside the array region using the via pattern and the same metal as the data lines. As is usual for an active matrix device, the voltage on the storage capacitor is transferred from the data line when the gate line is selected and switch 222 is closed connecting the data line to the storage capacitor. When the gate line is not selected, the switch is open and the voltage is maintained by the storage capacitor. The voltage difference between the storage capacitor and the previous (non-selected) gate line, to which bending beam 216 and deformable mirror 218 are connected, controls the deflection of the bending beam and hence the displacement of the deformable mirror. The gap (gap 35 as shown in FIG. 1) between deformable mirror and the polyimide spacer determines the thickness of dye which incident light traverses before being reflected from the mirror and hence the intensity of the reflected light.

Although described in terms of black dye and a reflective mirror, the present invention is applicable to other types of deformable mirror displays, for example, white dye and a black (non-reflective) mirror. Also, a sub-frame time modulation could be implemented to provide grey scale.

Having described preferred embodiments of a micromechanical displays and method for fabrication of same (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for fabricating a display device comprising the steps of:

patterning a black matrix layer on a transparent substrate;

depositing a first insulation layer on the patterned black matrix layer;

patterning a transparent conductor layer on the first insulation layer;

depositing a second insulation layer on the transparent conductor layer;

depositing a sacrificial layer on the second insulation layer for forming a gap of a predetermined distance between the second insulation layer and deformable members;

forming openings in the sacrificial layer for providing support points for the deformable members;

patterning a metal layer to form the deformable members; and removing the sacrificial layer to provide the gap.

2. The method as recited in claim 1, further comprising the step of:

filling the gap with a liquid including a dye such that in a first state of the deformable member the liquid is disposed in the gap between the transparent electrode and the deformable member and wherein in a second state the deformable member reduces the gap between the transparent electrode and the deformable member such that the liquid is substantially removed between the deformable member and the transparent electrode.

3. The method as recited in claim 1, wherein the sacrificial layer includes copper and the step of removing the sacrificial layer includes the step of removing the sacrificial layer by a wet etch process.

4. The method as recited in claim 1, wherein the deformable members include deformable mirrors.

5. A method for fabricating a deformable display device comprising the steps of:

patterning a transparent conductor layer on a transparent substrate;

forming an insulation layer over the transparent conductor layer;

patterning a conductive black matrix layer on the insulation layer and outside the active area, the black matrix layer forming a drain electrode for switches;

providing a source electrode and a gate electrode for switches by patterning one of the black matrix layer and the transparent conductor layer outside the active area;

patterning a sacrificial layer for forming features in the sacrificial layer for providing support points for deformable members and connections through the sacrificial layer; and patterning a metal layer on the sacrificial layer to form the deformable members and support points for the deformable members, the deformable members including deformable display members in the active area and switches outside the active area; and removing the sacrificial layer to provide a predetermined gap between the insulation over the transparent conductor and the deformable display members and to provide cantilevered conductors for the switches, the cantilevered conductors attaching to the source electrode and including a tip feature for contacting the drain electrode when the gate electrode is activated.

6. The method as recited in claim 5, wherein the step of patterning a sacrificial layer includes the steps of forming a via hole through the sacrificial layer to the source electrode; and forming a tip feature hole over the drain electrode such that upon patterning the metal layer the cantilevered conductor is attached to the source electrode and includes the tip feature for contacting the drain electrode.

7. The method as recited in claim 5, wherein the sacrificial layer includes a copper layer and further comprising the steps of:

forming dimples in the copper layer for forming the cantilevered conductors for switches; and forming openings through the copper layer to form vias through the sacrificial layer.

8. The method as recited in claim 5, wherein the deformable display members include deformable mirrors.

9. The method as recited in claim 5, further comprising the step of:

filling the gap with a-liquid including a dye such that in a first state of the deformable display member the liquid is disposed in the gap between the transparent electrode and the deformable display member and wherein in a second state the deformable display member reduces the gap between the transparent electrode and the deformable display member such that the liquid is substantially removed between the deformable display member and the transparent electrode.

* * * * *